United States Patent [19] Maeder et al.

[11] 3,751,647

[45] Aug. 7, 1973

[54] SEMICONDUCTOR AND INTEGRATED CIRCUIT DEVICE YIELD MODELING

[75] Inventors: Roger A. Maeder, Jericho; Frederick W. Oster, Charlotte; Richard J. Soderman, Essex Center, all of Vt.

[73] Assignee: International Business Machines Corporation, Armonk, N.Y.

[22] Filed: Sept. 22, 1971

[21] Appl. No.: 182,778

[52] U.S. Cl. .............................. 235/151.11, 29/574

[51] Int. Cl. .............................................. G03c 5/04

[58] Field of Search ...................... 29/574, 593, 577; 235/151.13

[56] References Cited

UNITED STATES PATENTS

| | | | |
|---|---|---|---|
| 3,151,237 | 9/1964 | Hrabak | 235/151.13 |
| 3,515,860 | 6/1970 | Fitzgerald, Jr. | 235/151.13 X |
| 3,618,199 | 11/1971 | King et al. | 29/569 |
| 3,260,838 | 7/1966 | Anderson | 235/151.13 X |
| 3,222,504 | 12/1965 | Arnold et al | 235/151.13 |
| 3,615,464 | 10/1971 | Augusta | 29/574 |
| 3,615,466 | 10/1971 | Sohni | 29/574 |
| 3,598,604 | 8/1971 | DePuy | 29/574 |

*Primary Examiner*—Milton S. Mehr
*Attorney*—Willis E. Higgins et al.

[57] ABSTRACT

Yield modeling for an integrated circuit manufacturing process utilizes the number of defects for each chip, rather than average defect density, in the prediction model. An overall predicted yield is obtained from individual yields calculated for regions of approximately homogenous yield within the region. By using this approach, and preferably utilizing actual yield data and defect information from previously produced devices as well, in generating the yield model, sufficiently accurate yield predictions are obtained to allow the predictions to be used to identify critical yield detracting operations in the manufacturing process. These critical detracting operations may then be changed to decrease the number of defects produced by them.

8 Claims, 5 Drawing Figures

INVENTORS
ROGER A. MAEDER
FREDERIC W. OSTER
RICHARD J. SODERMAN

BY Willis E. Higgins
ATTORNEY

SEMICONDUCTOR AND INTEGRATED CIRCUIT DEVICE YIELD MODELING

BACKGROUND OF THE INVENTION

1. Field of the Invention

This invention relates to a semiconductor and integrated circuit device manufacturing process. More particularly, it relates to such a process in which in-process yield predictions on the basis of a statistical model are utilized to identify critical yield detracting operations, so that these operations may be changed to decrease the number of defective devices caused by them. Thus, the present invention relates to a process which allows critical yield detracting operations to be determined and changed before manufacture of devices affected by such yield detracting operations has been completed.

2. Description of the Prior Art

The fabrication of integrated circuits, such as described by August et al. in commonly assigned U.S. Pat. 3,508,209, the disclosure of which is incorporated by reference herein, is an extremely complex process that involves several hundred or more individual operations. Basically, the process involves diffusing very precisely predetermined minute amounts of such impurities as phosphorous, arsenic or boron into precisely predetermined areas of a very pure silicon wafer. This is done by forming a silicon dioxide layer on the wafer, then utilizing a photomask and photoresist to define the pattern of areas into which diffusion is to occur through the silicon dioxide mask. Openings are then etched through the silicon dioxide to define the pattern of very small areas into which diffusion takes place. After a number of such diffusion operations have been carried out to produce desired transistors, diodes, resistors and the like in the silicon wafer, vacuum evaporated aluminum interconnection lines are defined, also by a photoresist and photomask process, to interconnect these circuit elements. A typical completed integrated circuit has thousands of minute diffusion areas contained within a chip of silicon measuring only about 0.1 inch by 0.1 inch and interconnected by a complex metallization pattern, the lines of which may vary from 0.2 to 0.6 thousandths of an inch in width.

Integrated circuit manufacturing processes must be carried out with the utmost precision and involve so many process steps that the manufacture of an integrated circuit from a blank wafer to a completed circuit may take as long as several months. For reliable operation, the electrical characteristics of the circuits must be kept within carefully controlled limits, which implies a high degree of process control over diffusion, photoresist application, exposure and development, etching, and similar processes.

Particularly in the case of the photoresist and photomask operations, the presence of dust, skin flakes, minute scratches and other imperfections in the patterns on the photomasks produce defective patterns on the semiconductor wafers, resulting in defective integrated circuits. Further, defects are introduced in the circuits during the diffusion operations themselves. Defective circuits may be identified both by visual inspection under high magnification and by rigorous electrical tests. Of course, once defective integrated circuits have been identified, it is desired to take steps to decrease the number of defective integrated circuits produced in the manufacturing process, thus increasing the yield of integrated circuits meeting specifications. It should be realized that, due to the complex nature of an integrated circuit manufacturing process, anywhere from 50 to 95 percent of fairly complicated completed integrated circuits may, in fact, be defective.

In attempting to decrease the number of defective integrated circuits produced, an integrated circuit manufacturing engineer is faced with the fact that any one of several hundred process operations may have caused a particular circuit to be defective. With such a confusing welter of variables to work with, the engineer has hitherto been unable to concentrate his efforts in the right critical yield detracting process operations. Detailed inspection of the completed defective circuits will provide some indication of which process operation may have caused the circuits to be defective. However, such a determination is usually a month or more after the particular process operation was carried out. It is typically discovered that, once a particular problem has been identified at final test, those responsible for carrying out the processing can confirm that at the time that particular process operation was carried out a month or more previously, a problem did exist, but it has since been corrected. At this time, different process operations are now typically causing problems. Thus, after the fact analysis of defective integrated circuits and identification of process operations causing these defective integrated circuits has proved inadequate as a means for increasing the overall yield of integrated circuits on a systematic basis.

A number of attempts to predict integrated circuit yield on the basis of such factors as defect densities in the photomasks, in the photoresist, and in diffusion operations have been reported in the literature. For example, Lawson, Jr., "A Prediction of the Photoresist Influence on Integrated Circuit Yield," SCP and Solid State Technology, July 1966, page 22, reports such work. However, Lawson concludes that, because the overall production of integrated circuits involves so many steps, yield figures cannot be reliably compared to his calculations. Subsequent investigators have attempted to improve the accuracy of yield predictions by, for example, using different statistical methods. Price, Proceedings of the IEEE, Aug. 1970, page 1290, discloses the use of Bose-Einstein statistics instead of Boltzmann statistics in an attempt to give a more accurate yield prediction. Despite improvements in yield prediction obtained by this and similar approaches, a need still remains for an integrated circuit yield modeling process which gives yield predictions sufficiently accurate to allow their use in identifying and changing critical yield detracting process operations. While some work has been reported on prediction and process changes on the basis of prediction in other fields, such as disclosed in U.S. Pat. No. 3,527,836, this approach has hitherto not found application in the complex processes required for fabrication of semiconductor and integrated circuit devices.

SUMMARY OF THE INVENTION

Accordingly, it is an object of this invention to provide a semiconductor and integrated circuit device manufacturing process including yield modeling which takes into consideration unique statistical natures of processes for manufacturing such devices.

It is another object of the invention to provide a semiconductor and integrated circuit device manufacturing process including a yield modeling process that gives sufficiently accurate yield predictions to allow its use for identifying critical yield detracting operations in the manufacturing process.

It is a further object of the invention to provide a semiconductor and integrated circuit device manufacturing process in which changes are made to reduce defects caused by critical process steps on the basis of information obtained from a yield prediction process.

It is yet another object of the invention to provide a semiconductor and integrated circuit device manufacturing process in which a yield prediction process is utilized to identify critical yield detracting operations so that they may be changed and in which actual defect data from manufactured devices is utilized to improve the accuracy of the yield prediction process.

It is still another object of the invention to provide a semiconductor and integrated circuit device manufacturing process in which a yield modeling process may be used to identify critical yield detracting operations while the manufacturing process is being carried out, so that the critical yield detracting operations can be changed without waiting for final test of the completed devices.

The attainment of these and related objects may be achieved with the present process for manufacturing semiconductor and integrated circuit devices in which yield modeling is used to predict integrated circuit yield with sufficient accuracy to allow identification and improvement in critical yield detracting operations of the manufacturing process. In the present process, defects which cause failure of devices are categorized into the most important types of defects which cause failure. This allows a few, perhaps 5 to 10, defect types to be identified for inspection purposes and thereby simplifies the inspection process. Rather than relying on an average defect density for the individual chips on the wafer as a whole, the number of defects of each type for each chip is determined and utilized in the yield predictions. As a result, a histogram for each defect type showing the number of chips on a wafer containing no defects, of the type, containing one defect of the type, two defects, and so forth may be established. This approach has been found necessary because experimental work has demonstrated that defects of a given type tend to be clustered about given areas rather than randomly distributed across the wafer. Further, it has been established that the yield of non-defective devices is different in different regions of a wafer. For most integrated circuit manufacturing processes, there is a radial dependency of yield, as reported by Sahni, in commonly assigned application Ser. No. 777,014, filed Nov. 19, 1968. This knowledge is utilized in the present process by predicting a yield for each region of substantially homogenous or equal yield within the region on the basis of the model. Then, an overall predicted yield is given by normalizing the individual yields for each region of substantially homogenous yield.

With both this approach and the approach of utilizing the number of defects per chip on a chip by chip basis, rather than an average defect density for the wafer as a whole, it has been discovered that yield predictions so obtained are closer to actual manufactured yield than obtained with prior art approaches to semiconductor device and integrated circuit yield modeling, which rely on statistical averages. Either utilizing the number of defects on a chip by chip basis, to account for clustering of defects, or utilizing individual yields predicted for regions of substantially homogenous yield on a semiconductor wafer, to account for the radial dependency of integrated circuit yield, will produce a substantial improvement in accuracy of yield prediction. Better results may be attained by employing both approaches in the yield modeling. Even greater accuracy in yield modeling may be attained by comparing th actual yield obtained, as measured by final test results, with the overall predicted yield for the integrated circuits, then utilizing this comparison to update the yield model. In this connection, it should be realized that, even with a relatively well established integrated circuit manufacturing process, conditions will change with time, especially if in-line process monitoring through yield modeling is utilized to identify areas of the process where changes may be made to increase yield. Thus, a yield model which will give accurate predictions of integrated circuit yield under certain conditions will have to be updated as those conditions change in order to maintain accuracy of the predictions.

By use of the approaches outlined above, a semiconductor device or integrated circuit manufacturing process may be divided into a number of process steps, with an in-process inspection occuring after each process step. A yield prediction may then be made for that process step on the basis of the defect data so obtained and the yield model for that particular process step. The knowledge gained by these yield predictions allows the identification of critical yield detracting process operations, which may then be changed to increase the yield obtained from that process step. By early, i.e., in process, identification of such critical yield detracting process operations, and by allowing engineering effort to be concentrated on these critical operations, marked increases in yield may be obtained in semiconductor and integrated circuit device processes.

The foregoing and other objects, features, and advantages of the invention will be apparent from the following more particular description of preferred embodiments of the invention, as illustrated in the accompanying drawings.

DESCRIPTION OF THE PREFERRED EMBODIMENTS

With the aid of the drawings, the present invention will now be described in greater detail.

Figure 1:
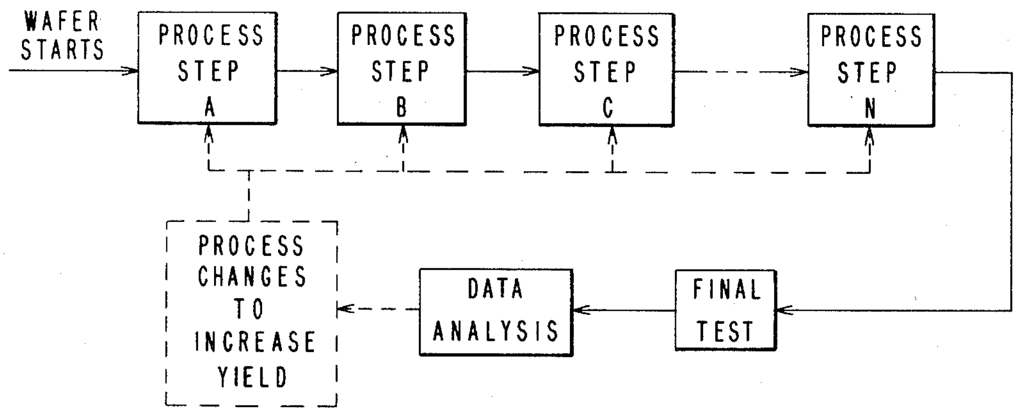
FIG. 1 (PRIOR ART)
FIG. 1 is a flow diagram representing a typical prior art integrated circuit manufacturing process and the manner in which process changes are made in it.
Figure 2:
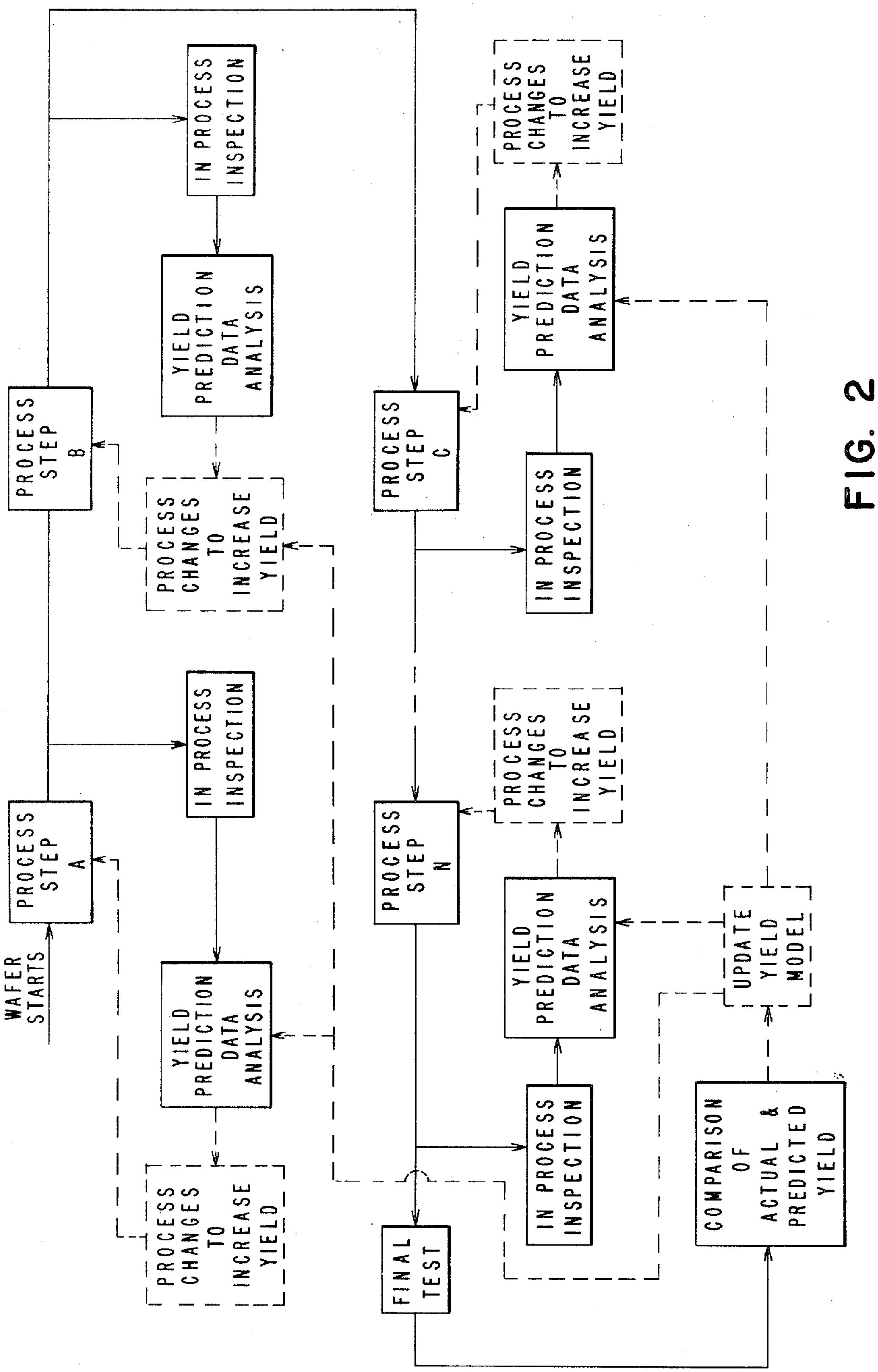
FIG. 2 is a flow diagram representing an integrated circuit manufacturing process carried out in accordance with the present invention, showing how process changes are made in it.

The flow diagrams of FIGS. 1 and 2 compare, respectively, the prior art method of making process changes to increase integrated circuit yield with the method of making process changes in accordance with the present invention. As shown in each flow diagram, the process steps themselves are represented by process step A, process step B, process step C, and process step N. In each case, these process steps may be portions of a process utilized for example, to make a mask utilized in the manufacture of the integrated circuits, or they may represent a sequence of operations employed as the result of use of a given mask in the manufacturing process. Such a sequence of operations is typically identified by reference to the particular mask used in connection with it, such as A level mask processing, B level mask processing, C level mask processing, N mask level processing, and the like. Thus, each of the processing steps A–N depicted in the flow diagrams of FIGS. 1 and 2 consists of a number of individual process operations. For further details of the precise nature of such individual process operations incorporated in each of the process steps A–N, reference is made to the above-mentioned Agusta et al. patent.

As shown in FIG. 1, prior art integrated circuit manufacturing requires the complete manufacturing of the integrated circuits before yield information can be obtained for use in making process changes to increase yield. In a typical integrated circuit manufacturing process, as many as 500 or more individual process operations may be incorporated in the process steps A–N there depicted. Each one of these individual process operations introduces defects into the integrated circuits being manufactured. After completion of process step N, the completed integrated circuits undergo final test, which usually involves both a visual inspection of the circuits and rigorous AC and DC electrical testing of the circuits. After completion of final test, analysis of the visual inspection data and the electrical test data is carried out to identify which defects cause the defective circuits to fail the electrical tests. On the basis of this after the fact yield analysis, process changes may be made in an attempt to increase integrated circuit yield. At this point, the process changes would be made a month or even longer after the earlier process steps, such as process steps A, B and C, were carried out. As a result, it is very difficult to increase yield in this manner, because a factor that may have caused defects in the integrated circuits a month or more ago has typically been observed as being out of specification and corrected, while other, and as yet unidentified, process operations are now out of specification. Due to the confusing welter of variables introduced by the 500 or more individual process operations, and the time lag between a given process operation and identification of it as a critical yield detracting operation, the prior art integrated circuit manufacturing process often involves implementation of process changes in the wrong areas at the time the changes are being made.

In contrast, the accurate yield predictions obtained in the present invention allow process control of an integrated circuit manufacturing process as shown in FIG. 2. FIG. 2 assumes that an overall yield prediction model has been generated made up of yield prediction models for each of the process steps A–N, utilizing defect data on a chip by chip basis and predicted yields for radial regions of approximately homogenous yield or equal yield within the region on semiconductor wafers. The generation of such yield prediction models will be explained in further detail below. In accordance with usual practice, semiconductor wafers are started in the manufacturing process by carrying out a sequence of individual process operations associated with a first mask, called an A level mask. This sequence of process operations comprises process step A. After completion of process step A, a visual inspection is made of at least representative samples of the partially fabricated integrated circuits in the wafers. The yield model for this particular process step allows data showing the number of defects of five or six critical types to be used to calculate the effect of each defect type on yield. Basically, this is accomplished by determining the probability that a defect of a particular type will cause a failing circuit. Given the effect of the defects of each type on integrated circuit yield, which of the defect types is causing the most significant problems in process step A is known. Manufacturing engineering analysis of the operations in process step A may then be carried out to determine which operations are causing the most critical defect type or types. Once these critical yield detracting operations are known, corrective measures on them may be taken to decrease the number of the most critical defect type or types produced. In a similar manner, in-process inspection and yield prediction for process steps B, C and the remainder of the steps through to process step N is carried out. On the basis of the yield predictions for each process step, process changes may also be made in process steps B–N for critical operations in order to decrease the number of defects produced by them.

Given an operating integrated circuit production line, all of the process steps A–N are being carried out simultaneously on different semiconductor wafers in different stages of process completion. This means that all of the steps shown in the flow diagram of FIG. 2 can be occurring simultaneously. However, for a particular group or lot of wafers passing through the manufacturing line, the steps shown occur sequentially as shown.

Given the yield prediction for each of the process steps, an overall predicted yield is obtained from them. After the integrated circuits undergo final AC and DC electrical tests, the actual yield of non-defective circuits may be compared with the overall predicted yields. If the actual and predicted yields are not in substantial agreement, the yield model is updated by carrying out a visual and/or physical inspection of the actual defective circuits to identify the defect types that caused the circuits to fail. This information then allows update of the yield model in a similar manner to its original generation.

The integrated circuit manufacturing process represented by the flow diagram of FIG. 2 therefore utilizes information feedback in two different ways. During the manufacturing process, information obtained from in-process inspection of the partially fabricated integrated circuits after each of the process steps A–N is utilized to obtain yield prediction data which identifies the types of defects causing yield detraction. This information in turn allows identification of critical yield detracting operations in the process steps, so that they may be changed to decrease the number of defects produced by them. Secondly, the comparison of actual and predicted yield provides a feedback of information utilized to update the yield model periodically, when process conditions change sufficiently so that a given yield model will no longer give accurate predicted integrated circuit yields.

The generation of a yield model for an integrated circuit manufacturing process will now be explained in detail If the process in question is an existing one, actual defective manufactured circuits may be visually and/or physically inspected to determine which kind of defects in the circuits produce final test failures for the circuits. If the circuit is one that has not yet undergone sufficient manufacturing to enable actual defect data for the particular circuit and final test data for that circuit to be used in generating the yield model, actual data from a similar circuit or a circuit which undergoes a similar process may be employed initially to develop a first pass yield model.

Figure 3A:
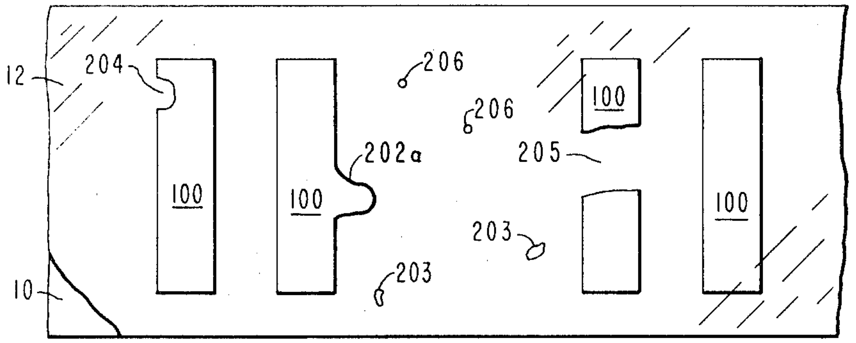
FIGS. 3A and 3B are plan views showing portions of integrated circuits and depict the most important defect types identified in a particular integrated circuit manufacturing process exemplified below.
Figure 3B:
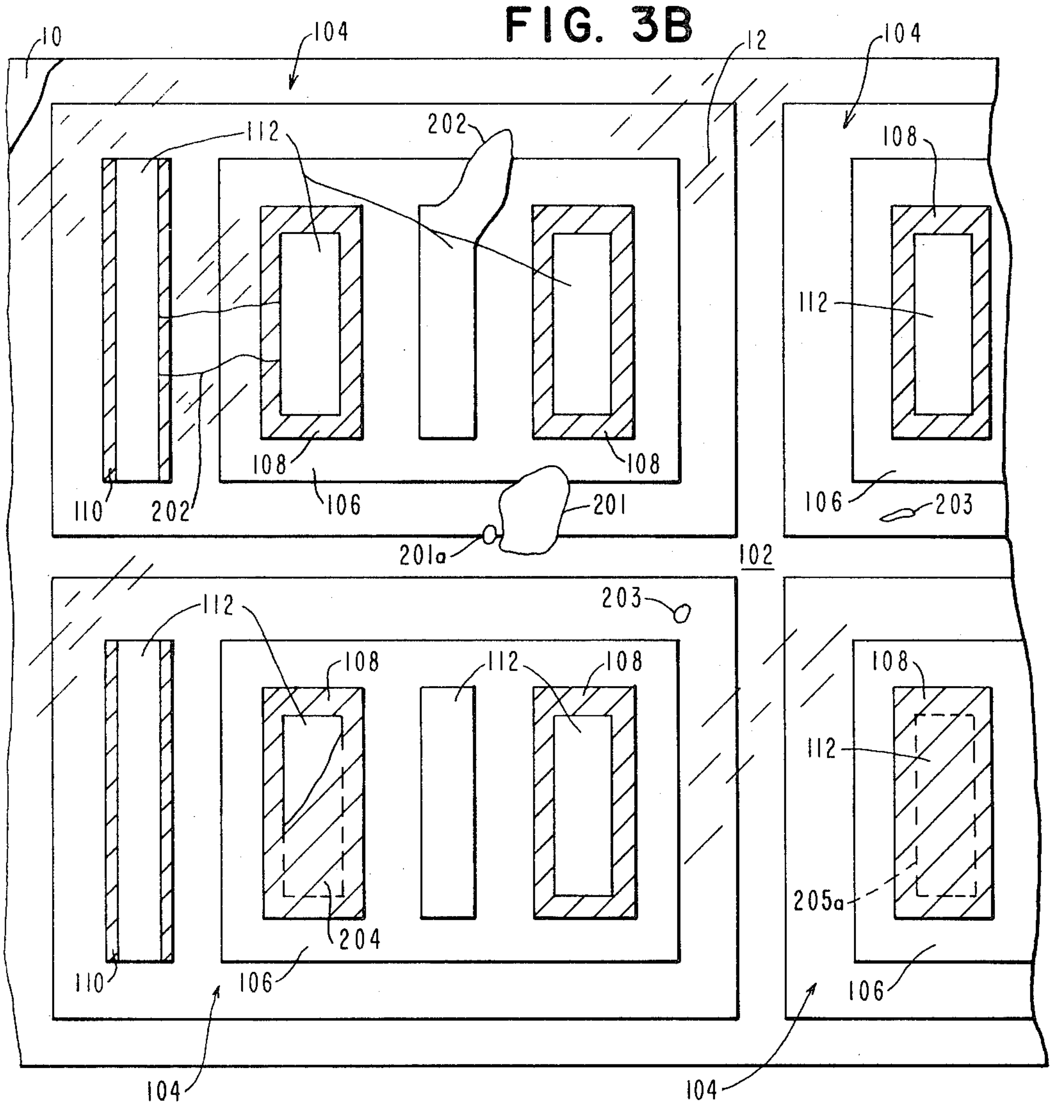

FIGS. 3A and 3B show portions of an integrated circuit together with six different types of defects which have been found to be the most significant yield detractors for this particular circuit. The partially completed circuits in each case are formed in a silicon substrate 10. Overlying the silicon substrate 10 is a layer of silicon dioxide 12. Patterns 100 shown in FIG. 3A represent resistor diffusions in silicon substrate 10 produced by applying a layer of photoresist to a previous silicon dioxide insulating layer on substrate 10, exposing the photoresist with a mask (B level) containing patterns corresponding to the diffusion areas 100, then etching the silicon dioxide to form openings corresponding to the areas 100. An impurity, in this case boron, is then diffused into the silicon substrate 10 to produce desired conductivity characteristics in the areas 100 to give the resistors. After the diffusion has been carried out, the oxide layer containing the diffusion windows is stripped from the silicon substrate 10, and oxide insulating layer 12 is grown over the entire surface of semiconductor substrate 10, in preparation for the next process step.

FIG. 3B shows another portion of the integrated circuit after process operations associated with another mask (E level) have been completed. As shown, the semiconductor substrate 10 has isolation diffusion 102 which serves to isolate transistors 104 from one another. Diffusions 106 form the bases of the transistors. Diffusions 108 form the emitters of the transistors. Diffusion 110 forms a portion of the collector of the transistors, the remainder of which is formed by a buried subcollector (not shown) within silicon substrate 10.

At process step E, the E level mask is utilized to make openings 112 in oxide layer 12 through which contact may be made to the particular portion of the transistor within which an opening 112 occurs. The E level mask contains the patterns for these openings and is used to expose a photoresist layer on oxide layer 12 to permit etching of openings 112 while maintaining the remainder of oxide layer 12 intact. In a subsequent operation, contact and interconnection metallurgy is deposited in the openings 112 and on the surface of oxide layer 12.

With this background on the integrated circuit structures shown in FIGS. 3A and 3B, the six defect types also shown in FIGS. 3A and 3B may now be explained. The first defect type is a large etched hole, denoted by the reference numeral 201 in FIG. 3B. A large etched hole may be defined as a randomly occuring hole through oxide layer 12 which is equal to or greater than a predetermined size (e.g., 0.2 mils) in any direction. Small hole **201*a* associated with large etched hole 201 is classified as a part of large etched hole 201 for defect counting purposes. The second type of defect, indicated by the reference number 202, is an etched extension. An etched extension is an area extending more than a given distance (e.g., 0.2 mils) from a normal etched window boundary. In the case of FIG. 3A, the etched extension 202 is manifested as an enlargement of one of diffusion areas 100. In FIG. 3A, etched extension 202*a* is manifested as an enlargement of one of the openings 112 in oxide layer 12. Small etched holes, the third defect type, are indicated by the reference number 203. A small etched hole is any randomly occuring non-circular hole through the oxide layer 12 of less than a given size (e.g., 0.2 mils). Reference numeral 204 indicates the fourth defect type, residual oxide, which is oxide occuring in a window region which reduces the window size by more than a given amount, such as reducing a resistor window to less than 0.1 mils width over a distance of more than 0.2 mils in the case of process step B, the results of which are shown in FIG. 3A, or which reduces a contact window size by more than 50 percent in the case of process step E, the results of which are shown in FIG. 3B. This difference in definition for residual oxide for the two different process steps illustrates that some defect types are more critical as yield detractors in some process steps than in others and are therefore defined more or less strictly as appropriate. The fifth defect type, reduced or broken pattern, is indicated in FIG. 3A by reference number 205. A broken pattern is caused by oxide giving a discontinuity in a resistor window which is more than a given width (e.g., 0.2 mils). In the case of the process step E, a missing pattern defect is a broken pattern that completely closes a contact hole, as indicated by the reference number 205*a* there. A sixth type of defect, indicated by the reference number 206,** is a pinhole, defined as a small round hole less than a given size (e.g., 0.2 mil). The definitions of a pinhole and a small etched hole are quite similar, but round holes as opposed to irregularly shaped holes are produced by different causes.

Once the five or ten most significant yield detracting defect types have been established for a given integrated circuit by inspection of defective circuits to see what defects caused them to fail, it is necessary to determine the likelihood that a given defect of these types will in fact produce a defective circuit. This is done by determining the ratio of the area in the integrated circuit in which the defect type will cause a failure in performance to the area of the integrated circuit in which the defect may occur without causing a failure. As an example, consider defect **202*a*, an etched extension, shown in FIG. 3A. In the position shown, this extension of diffusion 100 will only alter the value of the resistor formed by the diffusion. However, if etched extension 202*a* had occurred on diffusion 100 to the left of where it is shown, it would have shorted the two regions 100** together, and resulted in failure of the circuit. A more complete description of how the ratio of area in which a defect will cause failure to area in which a defect will not cause failure may be determined is contained in the above referenced Lawson, Jr. article. Rather than determining the probability that a given defect will produce a failure purely by mathematics, as taught by Lawson, Jr., can be determined much easier and rapidly by simulation techniques as taught in a co-pending, commonly assigned application (IBM Docket No. BU-9-71-011) by Gary A. Donafrio, concurrently filed with the present application.

Figure 4:
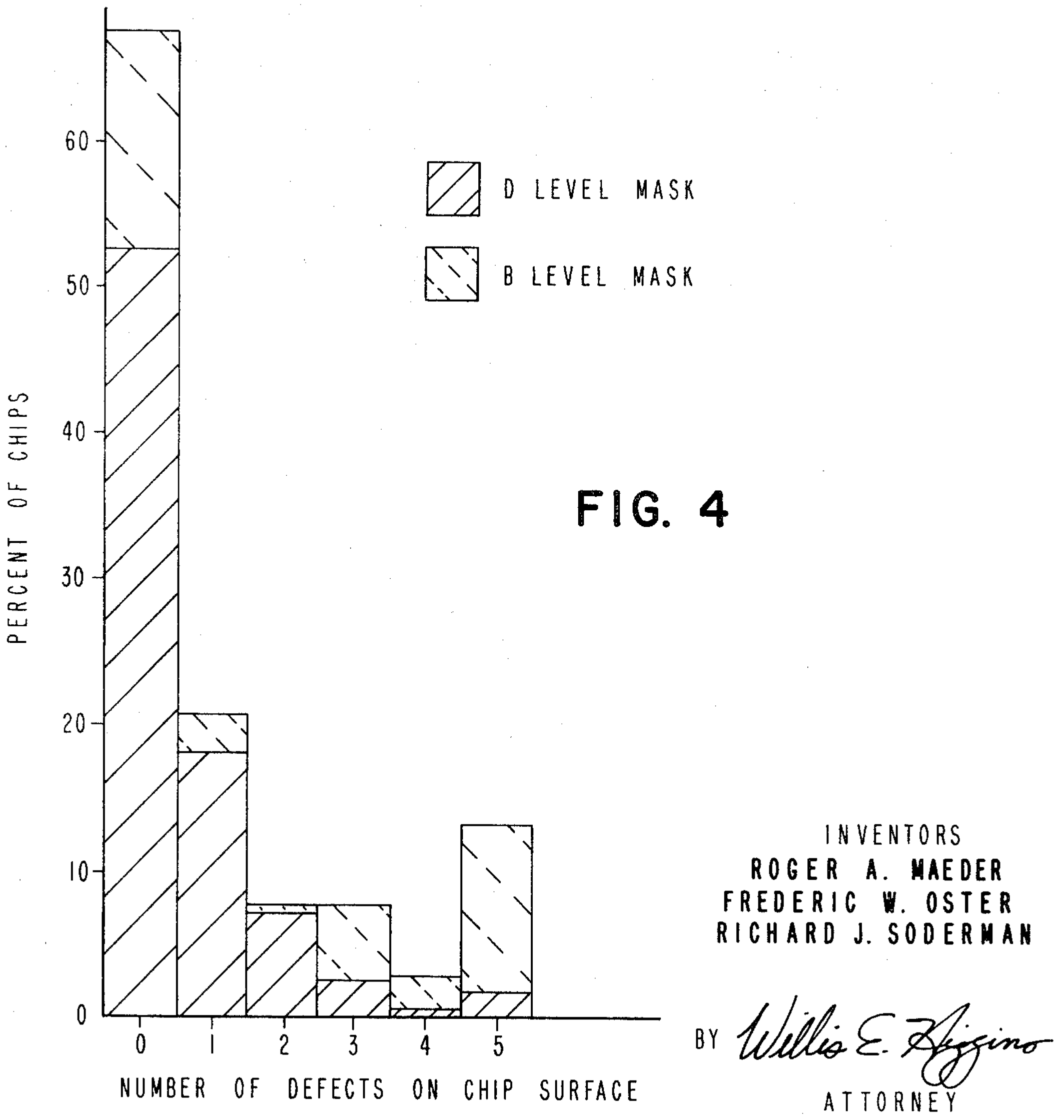
FIG. 4 shows a typical histogram obtained in chip by chip defect analysis in practice of the invention.

To determine the effect of a particular defect type on integrated circuit yields, it is necessary in accordance with the invention to know the number or percentage of chips containing no defect of the type, one defect of the type, and so on. A convenient way of showing such data is by means of a histogram, such as shown in FIG. 4. The histogram of FIG. 4 simply shows the percentage of chips in a sample containing the number of defects of a particular type, in this case small etched holes, indicated. The data of the histogram show the percentage of integrated circuit chips processed at two different mask levels (B and D) for a time period of a month containing 0, 1, 2, 3, 4 and 5 or more small etched holes.

A general solution for yield as a result of a particular defect that uses the probability that a particular defect of the type will cause a defective circuit and data showing the number of this defect type by chip may be derived as follows.

Let $\lambda i$ be the probability that defect type $i$ will cause chip failure. Then $1-\lambda i$ is the probability that a chip will survive with the $i$ th' defect type on it. If a chip has no defects of type $i$, the yield (assuming no other defects are present) is 100 percent. If a chip has one defect of type $i$, the yield (again assuming no other defects) is $100 \cdot (1 - \lambda i)$ percent. The probability that a chip will survive with two defects of type $i$ is $(1 - \lambda i)^2$, thus the estimated yield is $100 \cdot (1 - \lambda i)^2$. If a given quantity of chips are inspected for defect type $i$, the yield for this given quantity of chips is then the weighted average of the yield for chips in each bar of a histogram similar to that of FIG. 4 obtained as a result of the inspection. Thus, the effect of the particular defect type may be calculated as follows:

$$\text{Yield} = {}^{N}o\,(1-\lambda i)^o + {}^{N}1\,(1-\lambda i)^1 + {}^{N}2\,(1-\lambda i)^2 + \ldots / N_o + N_1 + N_2 + \ldots\ldots$$

For integrated circuits of the type shown in FIGS. 3A and 3B for process steps B and E, the probability that a defect of each of the six types defined previously will cause a failure of a circuit containing the defects is as shown in Table I.

TABLE I

| Defect | Probability Defect Will Cause Failure B Mask | E Mask |
|---|---|---|
| Large Etched Hole | 0.60 | 0.60 |
| Etched Extension | 0.70 | 0.30 |
| Small Etched Hole | 0.45 | 0.30 |
| Pinhole | 0.45 | 0.30 |
| Residual Oxide | 0.40 | 0 |
| Broken or Missing Pattern | 0.80 | 1.00 |

While calculations using the above formula could be carried out manually, it is much more convenient, due to the complexity and large number of calculations involved, to utilize a suitably programmed general purpose data processing machine, such as an IBM System/360 model 50 computer. The computer may be programmed using the above equation as the basic algorithm, utilizing Fortran IV, PL/1 or any other suitable known programming language. For use in an integrated circuit manufacturing environment, it is preferred to have the capability of both entering data into the computer and receiving output at remote terminals, such as IBM 2260 display stations or similar I/O devices located in the manufacturing areas.

This invention can be used in two different ways to monitor a process line. If defect data is collected for one particular time on the line, it can be used as a diagnostic tool to evaluate the overall performance of the line at that time. To predict a yield that should be obtained for a given group or lot of wafers as they pass through the line, it is necessary to take data for each process operation at the time the wafers undergo that particular process step. This data, which will probably span a time of a month or more, is utilized to give a yield prediction for each of the process steps at the time they are carried out on the lot of wafers. At the conclusion of processing, the yield figures from different time periods can then be combined to give an overall yield figure, which may then be compared with actual yield after final test. It is preferred to program the computer to have the capability of manipulating the data either way.

The following non-limiting examples servo to describe the invention further and illustrate its advantages.

Example I

Using data from integrated circuit production for a time period of one week, photo limited yields are calculated using a suitably programmed IBM System/360 Model 50 computer on the basis of the above formula for the six defect types described above for four mask levels. The results of these calculations are shown below in Table II.

TABLE II

| Defect type | Yield A Region | B Region | C Region | Average |
|---|---|---|---|---|
| Mask-Level B: | | | | |
| Large etched holes | 94.8 | 93.2 | 84.2 | 92.0 |
| Etched extension | 93.4 | 93.1 | 92.0 | 93.0 |
| Small etched holes | 91.2 | 89.7 | 86.0 | 89.5 |
| Pinholes | 96.5 | 96.5 | 93.2 | 95.8 |
| Residual oxide | 98.3 | 96.7 | 94.6 | 96.9 |
| Broken pattern | 93.5 | 75.6 | 79.9 | 83.2 |
| B-Mask total | 71.7 | 54.2 | 46.9 | 59.7 |
| Mask-Level C: | | | | |
| Large etched holes | 97.4 | 95.6 | 94.4 | 96.1 |
| Etched extension | 92.6 | 89.0 | 89.2 | 90.5 |
| Small etched holes | 99.2 | 98.9 | 98.2 | 98.9 |
| Pinholes | 99.6 | 99.7 | 99.6 | 99.6 |
| Residual oxide | 99.8 | 98.9 | 99.4 | 99.5 |
| Reduced pattern | 100.0 | 98.9 | 99.6 | 99.5 |
| C-Mask total | 89.0 | 81.9 | 81.5 | 84.7 |
| Mask-Level D: | | | | |
| Large etched holes | 95.9 | 92.5 | 93.2 | 94.0 |
| Etched extension | 98.6 | 95.4 | 94.1 | 96.4 |
| Small etched holes | 99.9 | 99.8 | 99.7 | 99.8 |
| Pinholes | 100.0 | 100.0 | 99.8 | 99.9 |
| Residual oxide | 99.2 | 97.4 | 91.1 | 96.9 |
| Reduced pattern | 98.8 | 98.8 | 92.6 | 97.5 |
| D-Mask total | 92.5 | 84.6 | 73.6 | 85.6 |
| Mask-Level E: | | | | |
| Large etched holes | 96.7 | 93.8 | 91.2 | 94.4 |
| Etched extension | 97.1 | 94.0 | 92.4 | 94.9 |
| Small etch holes | 96.1 | 96.2 | 94.6 | 95.8 |
| Pinholes | 98.8 | 97.6 | 97.4 | 98.1 |
| Residual oxide | 100 0 | 100.0 | 100.0 | 100.0 |
| Missing pattern | 99.2 | 93.4 | 95.0 | 96.0 |
| E-Mask total | 88.5 | 77.3 | 73.8 | 81.1 |

The number of defects for each integrated circuit in the wafers inspected is determined and recorded in a manner similar to the histogram of FIG. 4. As indicated in the table, the wafers are divided into A, B and C regions, each of approximately homogenous final yield.

As can be seen in the table, with the process steps associated with the B-level mask, at this time a predicted photo limited yield of 59.7 percent is obtained. For mask levels C, D and E, predicted photo limited yields of 84.7, 85.6 and 81.1 are obtained. These results show, for the time period in question, the largest contributions to defective integrated circuits are being made with the process steps associated with mask level B. This indicates that engineering efforts should be concentrated on those process steps to have the largest impact in increasing yields.

As a result of detailed analysis of the defects being produced at mask level B in processing, it is determined that a negative photoresist being employed for these process steps should be replaced with a positive photoresist. This process change is made, and photo limited yields are again calculated for the same four mask levels in the production of the same integrated circuit, with the results shown below in Table III.

TABLE III

| Defect type | Yield A Region | B Region | C Region | Average |
|---|---|---|---|---|
| Mask-Level B: | | | | |
| Large etched holes | 97.0 | 95.2 | 94.3 | 95.8 |
| Etched extension | 81.7 | 87.0 | 89.7 | 85.4 |
| Small etched holes | 98.4 | 98.5 | 97.1 | 98.2 |
| Pinholes | 99.5 | 99.5 | 98.3 | 99.3 |
| Residual oxide | 99.7 | 98.7 | 97.2 | 98.8 |
| Broken pattern | 97.4 | 95.1 | 92.4 | 95.5 |
| B-Mask total | 75.4 | 76.2 | 72.5 | 75.2 |
| Mask-Level C: | | | | |
| Large etched holes | 98.1 | 97.5 | 97.1 | 97.7 |
| Etched extension | 92.7 | 93.9 | 92.0 | 93.0 |
| Small etched holes | 99.5 | 99.5 | 99.3 | 99.5 |
| Pinholes | 99.9 | 99.9 | 99.9 | 99.9 |
| Residual oxide | 99.5 | 99.3 | 97.4 | 99.0 |
| Reduced pattern | 100.0 | 99.4 | 99.6 | 99.7 |
| C-Mask total | 90.0 | 89.8 | 85.9 | 89.1 |
| Mask-Level D: | | | | |
| Large etched holes | 98.7 | 97.4 | 93.5 | 97.1 |
| Etched extension | 98.9 | 98.3 | 90.3 | 96.6 |
| Small etched holes | 100.0 | 99.9 | 99.9 | 99.9 |
| Pinholes | 100.0 | 100.0 | 100.0 | 100.0 |
| Residual oxide | 99.8 | 99.4 | 99.3 | 99.5 |
| Reduced pattern | 99.7 | 99.5 | 97.9 | 99.3 |
| D-Mask total | 96.2 | 94.5 | 82.0 | 92.7 |
| Mask-Level E: | | | | |
| Large etched holes | 99.1 | 97.9 | 95.6 | 97.9 |
| Etched extension | 98.3 | 97.7 | 97.2 | 97.8 |
| Small etched holes | 99.6 | 99.1 | 97.5 | 99.0 |
| Pinholes | 100.0 | 99.9 | 100.0 | 100.0 |
| Residual oxide | 100.0 | 100.0 | 100.0 | 100.0 |
| Missing pattern | 99.1 | 95.9 | 94.1 | 96.8 |
| E-Mask total | 96.2 | 90.0 | 85.3 | 91.9 |

Table III shows an increase in overall average photo limited yield for the process steps associated with mask level B to 75.2 percent. As a result of various other process changes introduced in the three other mask levels, they show lesser improvement in their average overall photo limited yield.

The above tables show the increase in photo limited yield obtained as a result of change in negative to positive photoresist indicated as a result of use of the photo limited yield model for a time period of 1 week both before introduction of the change and after introduction of the change. For the month preceding the change from negative to positive resist the overall average photo limited yield for the process step system associated with the B-level mask is 55.0 percent. For the month after introduction of the positive photoresist, the overall predicted photo limited yield for the process step associated with the B-level mask is 74.5 percent.

Example II

The data reported above in Example I also show the importance of subdividing semiconductor wafers into regions of approximately equal process yield for photolimited yield prediction purposes. For mask level B in Table II, in the row labeled "B-Mask Total," the predicted photolimited yield for each of the regions A, B and C show substantially higher predicted yields in region A than in either region B or C. Comparing these results with the corresponding results shown in Table III, after introduction of the positive photoresist, the predicted photolimited yields for regions B and C show a marked increase, while the predicted photolimited yield for region A only increases very slightly. Specifically, the data in Table III show an increase in defects produced by etched extensions at the B-mask level.

Detailed analysis of the circuits produced at this time and the process conditions shows that the increase in etched extensions is caused by damage to the positive photo-resist in region A of the wafer because it is necessary to apply the photoresist to the reverse side of the semiconductor wafer, and during this operation the positive photoresist in the A region of the wafer is contacted. Changing the process to eliminate the necessity to contact the photoresist in region A of the wafer should eliminate the problem of increased etched extension defects indicated by the data in Table III.

Example III

Calculation of the overall predicted photo limited yield using the data of Table III for Mask-Level B and assuming a Poisson (i.e., random) distribution of the defects shows the necessity to utilize defect distribution per chip and regions of differing yield. Details on the calculation of photo limited yields assuming a Poisson distribution are available in the Lawson, Jr. article previously referenced. On the basis of an assumed Poisson distribution of defects an overall photo limited yield of 69.2 for the B-level mask is obtained. Using the defect distribution per chip and the three regions of homogenous yield an overall photo limited yield for the B-level mask of 75.2 is obtained, as shown in Table III. Comparison of actual yields with predicted yields obtained using defect distribution per chip and regions of homogenous yield show excellent agreement in results. On the other hand, there is a poor correlation between actual results and predicted yields made assuming a Poisson distribution of defects.

The above examples show how integrated circuit yield modeling in accordance with the invention can be utilized to make process changes in critical yield detracting operations to increase integrated circuit yields. The above examples have been in terms of process operations during the actual production of the integrated circuits on a semiconductor wafer and have concerned defects introduced by masks for photoresist used in integrated circuit production. It should be apparent that the same type of analysis can be used during production of the masks themselves. Also, different types of defects, such as diffusion pipes, stacking faults, and the like are introduced as a result of diffusion operations. A diffusion limited yield can be predicted on the basis of a similar analysis and utilized together with the photolimited yield to predict an overall final test yield for the integrated circuits.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a process for the manufacture of semiconductor devices as an array on a wafer, the improvement comprising:

A. evaluating the likelihood that a defect of a given type will produce a defective device in the process, B. inspecting at least representative samples of the devices for the defects by process step to determine the actual number of the defects for each device, C. determining, on the basis of the actual number of defects for each device and the likelihood of each defect causing a defective device,critical yield detracting operations in said manufacturing process, and D. changing the critical yield detracting operations to decrease the number of defects produced by them.

2. The process of claim 1 in which the array is divided into regions of approximately homogenous yield, and the critical yield detracting operations are determined for each region on the basis of its defect data.

3. The process of claim 2 in which the semiconductor devices are integrated circuits.

4. In a process for the manufacture of integrated circuits on a wafer, the improvement comprising:

A. characterizing defects which cause failure of the circuits,

B. evaluating the likelihood that a defect of a given type will produce a defective device in the process, C. establishing criteria for in process inspection for each characterized defect type, D. inspecting at least representative samples of the circuits for the defects by process step to determine the actual number of the defects for each circuit, E. determining, on the basis of the actual number of defects for each circuit and the likelihood of each defect causing a defective circuit, critical yield detracting operations in said manufacturing process and F. changing the critical yield detracting operations to decrease the number of defects produced by them.

5. The process of claim 4 additionally comprising the step of:

G. periodically checking actual circuits produced to check the continued applicability of the characterized defects as significant yield detracting and the accuracy of the determination of the likelihood that a defect of a given type will produce a defective circuit.

6. The process of claim 4 additionally comprising the step of:

H. predicting, on the basis of the number of defects for each circuit and the likelihood of each defect causing a defective device, a yield of non-defective circuits that will be achieved by the particular run of said manufacturing process.

7. The process of claim 6 in which said yield is predicted on the basis of the defect data for each process step at the time the particular run passed through that process step.

8. The process of claim 7 in which a yield prediction is made on the basis of the defect data obtained for each process step at a particular time, as a diagnostic measure of the entire process at the particular time.

* * * * *